United States Patent
Ogawa

(10) Patent No.: US 11,413,981 B2
(45) Date of Patent: Aug. 16, 2022

(54) ELECTRIC POWER MANAGEMENT DEVICE

(71) Applicant: HONDA MOTOR CO., LTD., Tokyo (JP)

(72) Inventor: Makoto Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 16/815,480

(22) Filed: Mar. 11, 2020

(65) Prior Publication Data

US 2020/0290473 A1  Sep. 17, 2020

(30) Foreign Application Priority Data

Mar. 15, 2019 (JP) .............................. JP2019-048697

(51) Int. Cl.
*B60L 53/62* (2019.01)
*B60L 50/60* (2019.01)
(Continued)

(52) U.S. Cl.
CPC ............... *B60L 53/62* (2019.02); *B60L 50/60* (2019.02); *B60L 53/18* (2019.02); *B60L 53/305* (2019.02);
(Continued)

(58) Field of Classification Search
CPC .......... B60L 53/62; B60L 50/60; B60L 53/18; B60L 53/305; B60L 58/13; B60L 2240/80; B60L 53/50; B60L 53/66; B60L 55/00; B60L 58/20; B60L 3/0046; B60L 53/60; B60L 53/10; B60L 53/11; H02J 7/0068;
(Continued)

(56) References Cited

U.S. PATENT DOCUMENTS

| 10,414,283 B2 | 9/2019 | Kudo et al. | |
| 2015/0057827 A1* | 2/2015 | Uchikawa | G05F 1/66 700/297 |
| 2018/0312072 A1* | 11/2018 | Yang | B60L 53/67 |

FOREIGN PATENT DOCUMENTS

| EP | 3 363 676 A1 | 8/2018 |
| JP | 2015-109791 | 6/2015 |

(Continued)

OTHER PUBLICATIONS

European Search Report dated Apr. 23, 2020, 9 pages.

*Primary Examiner* — Lincoln D Donovan
*Assistant Examiner* — Alex W Lam
(74) *Attorney, Agent, or Firm* — Rankin, Hill & Clark LLP

(57) ABSTRACT

An electric power management device that manages electric power in a building configured to be electrically connectable to a vehicle including a battery, the device comprising a command issuing unit configured to issue a command to perform charging and discharging of the battery, a specifying unit configured to specify a target range for a charging rate of the battery in performing charging and discharging, and a storage unit configured to store the charging rate in performing charging and discharging, wherein the command issuing unit restrains an issuance of a command to start discharging when the stored charging rate is not more than a lower-limit value of the target range, and restrains an issuance of a command to start charging when the stored charging rate is not less than an upper-limit value of the target range.

7 Claims, 5 Drawing Sheets

(51) Int. Cl.
*B60L 58/13* (2019.01)
*B60L 53/18* (2019.01)
*B60L 53/30* (2019.01)
*H02J 7/00* (2006.01)

(52) U.S. Cl.
CPC .............. *B60L 58/13* (2019.02); *H02J 7/007* (2013.01); *H02J 7/0068* (2013.01)

(58) Field of Classification Search
CPC ........ H02J 7/007; H02J 3/144; H02J 7/00716; H02J 3/322; H02J 9/002; H02J 7/0029; H02J 2310/64; H02J 2310/48; Y02B 70/3225; Y02E 60/00; Y02T 10/70; Y02T 10/7072; Y02T 90/12; Y02T 90/14; Y02T 90/16; Y02T 90/167; Y04S 10/126; Y04S 20/222; Y04S 30/12
See application file for complete search history.

(56) References Cited

FOREIGN PATENT DOCUMENTS

| | | |
|---|---|---|
| JP | 6242006 | 12/2017 |
| JP | 6402256 | 9/2018 |
| WO | 2013/046656 | 4/2013 |
| WO | 2018/084152 | 5/2018 |

\* cited by examiner

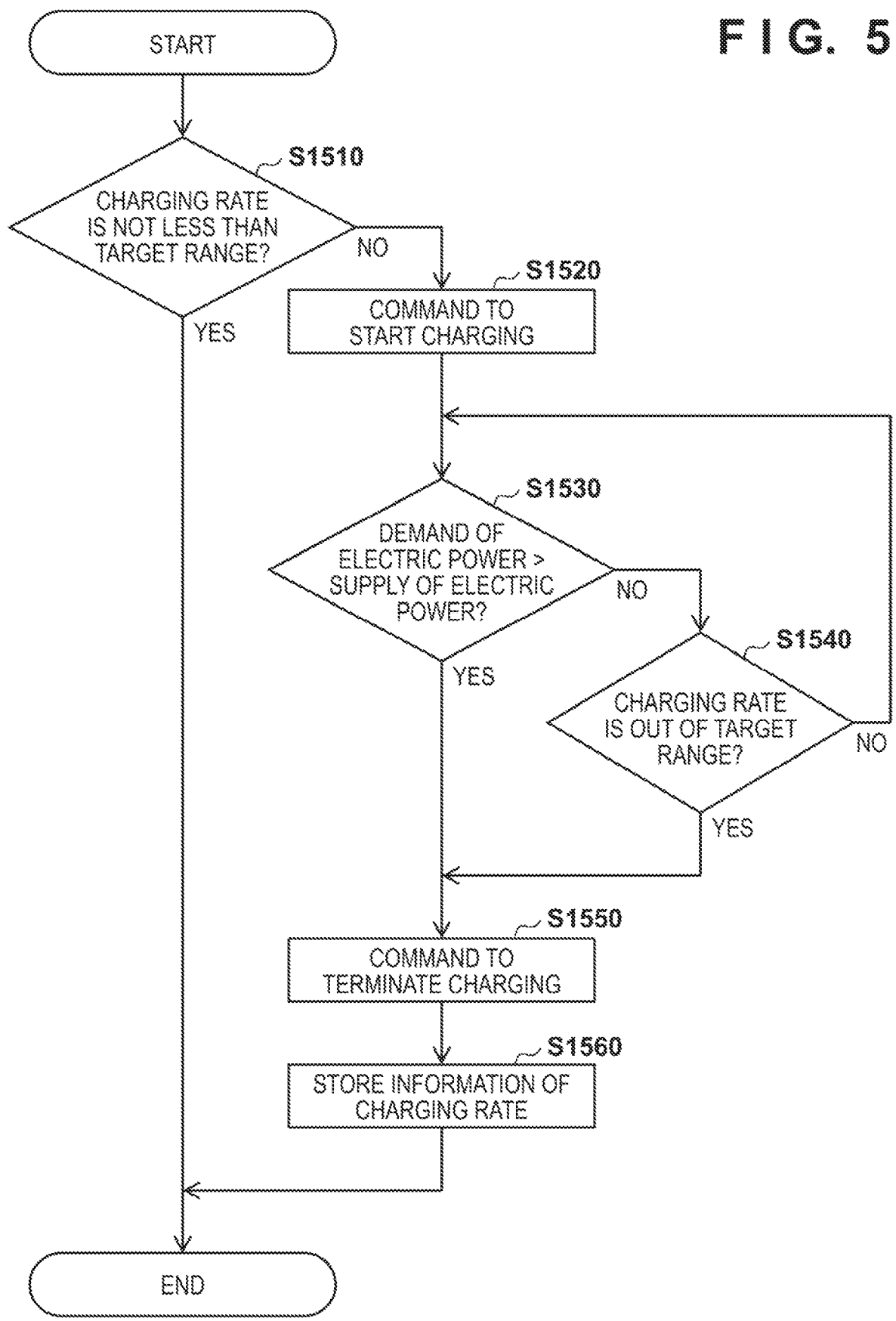

ELECTRIC POWER MANAGEMENT DEVICE

CROSS-REFERENCE TO RELATED APPLICATION(S)

This application claims priority to and the benefit of Japanese Patent Application No. 2019-048697 filed on Mar. 15, 2019, the entire disclosure of which is incorporated herein by reference.

BACKGROUND OF THE INVENTION

Field of the Invention

The present invention relates to an electric power management device.

Description of the Related Art

While a vehicle equipped with a battery such as an electric vehicle is parked in a building such as one's own house and an office, a user can charge the battery of the vehicle using a terminal installed in the building (see Japanese Patent No. 6242006). For charging the battery, electric power from an electric power system (utility power) can be used, and in addition, electric power generated in the building, for example, electric power generated by a power generator such as a photovoltaic power generator, can be used.

In the configuration described above, the battery can be utilized as a storage battery; for example, electric power of the battery can be used in substitution for the electric power from the electric power system, in accordance with supply-demand balance of electric power in the building (see Japanese Patent No. 6402256). For such a configuration, there is a demand for a technique to utilize the battery appropriately.

SUMMARY OF THE INVENTION

The present invention enables appropriate utilization of a battery of a vehicle electrically connected to a building.

One of the aspects of the present invention provides an electric power management device that manages electric power in a building configured to be electrically connectable to a vehicle including a battery, the electric power management device, comprising a command issuing unit configured to issue a command to perform charging and discharging of the battery, a specifying unit configured to specify a target range for a charging rate of the battery in performing the charging and discharging, and a storage unit configured to store the charging rate of the battery in performing the charging and discharging, wherein in a case where the charging rate stored in the storage unit is not more than a lower-limit value of the target range, the command issuing unit restrains an issuance of a command to start discharging of the battery, and in a case where the charging rate is not less than an upper-limit value of the target range, the command issuing unit restrains an issuance of a command to start charging of the battery.

Further features of the present invention will become apparent from the following description of exemplary embodiments with reference to the attached drawings.

BRIEF DESCRIPTION OF THE DRAWINGS

FIG. 2B1 is a timing chart used for describing an example of an aspect of the electric power management;

FIG. 2B2 is a timing chart used for describing an example of an aspect of the electric power management;

FIG. 2C1 is a timing chart used for describing an example of an aspect of the electric power management;

FIG. 2C2 is a timing chart used for describing an example of an aspect of the electric power management;

FIG. 5 is a flowchart used for describing the example of the electric power management method according to the embodiment.

DESCRIPTION OF THE EMBODIMENTS

Figure 1:
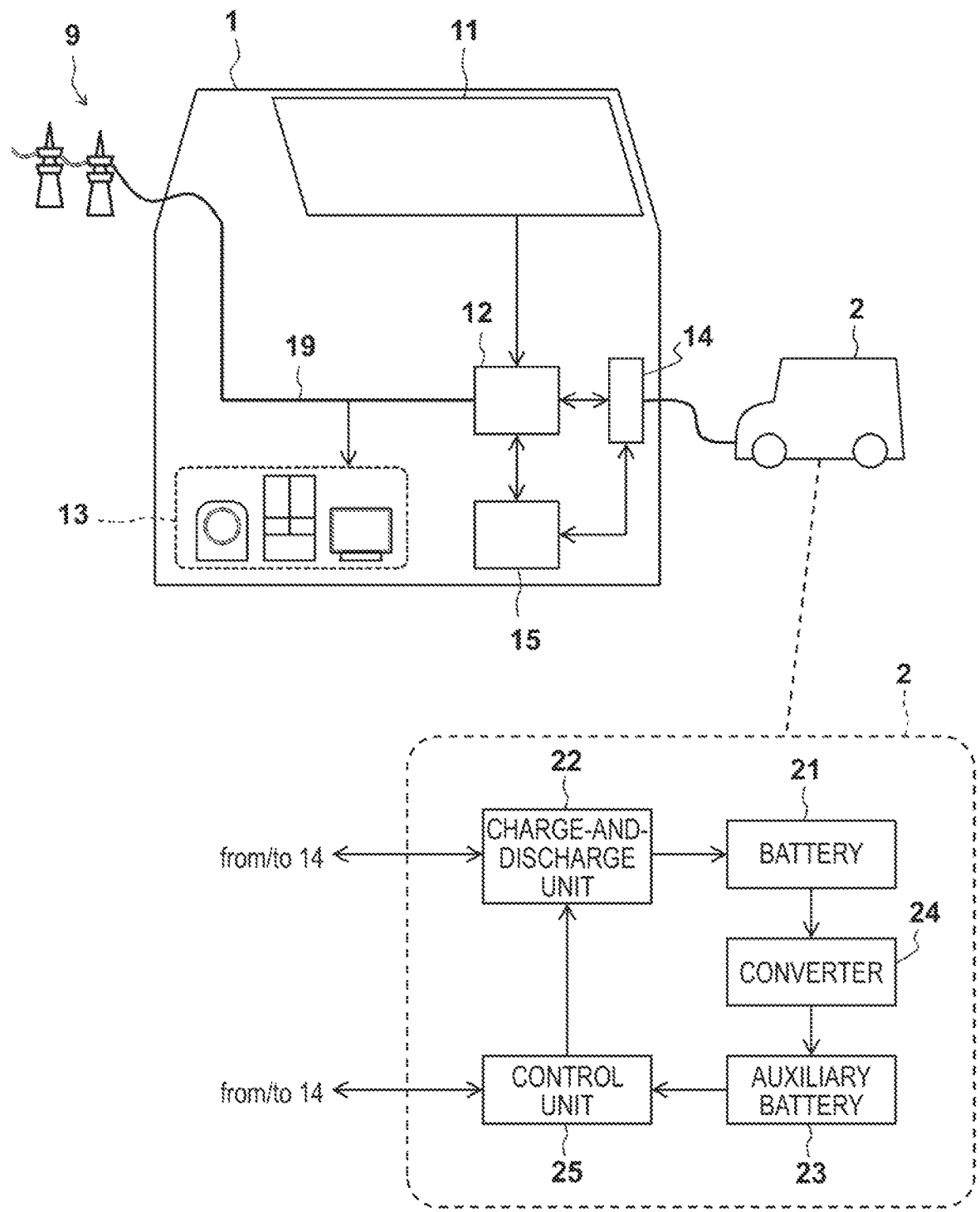
FIG. 1 is a schematic diagram used for describing a configuration example of an electric power management system in a building.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIG. 1 illustrates a configuration example of an electric power management system SY of a building 1 according to an embodiment. The building 1 is configured to be able to receive electric power from an electric power system 9 (utility power) and includes a power generator 11, an inverter 12, an electrical apparatus group 13, a vehicle connection mechanism 14, and an electric power management device 15. For ease of description, the building 1 is assumed to be a private house in the present embodiment but may be an apartment house such as a condominium, an office building such as a company office building, or a commercial facility such as a supermarket, as another embodiment. The electric power system 9 is a system that generates, transforms, transmits, and distributes electric power to enable power supply to individual customers (including the building 1). A concept of the electric power system 9 covers an electric power company, a power plant, a transformer substation, a power transmission line, and the like. The building 1 can purchase electric power from the electric power system 9, and the electric power is supplied to an electric power line 19 in the building 1.

The power generator 11 generates another kind of electric power different from the electric power from the electric power system 9. In the present embodiment, the power generator 11 is assumed to be a photovoltaic power generator (solar panel) that generates electric power from sunlight, but may be a power generator using other kinds of renewable energy such as water power, wind power, and geothermal energy, in other embodiments.

The inverter 12 is also called as a power conditioner or the like, and can convert electric power provided from the power generator 11 (e.g., DC voltage) into an electric power available in the building 1 (e.g., AC voltage) and supply the converted electric power to the electric power line 19.

The electrical apparatus group 13 includes one or more electrical apparatuses operable on the electric power of the electric power line 19, and typical examples of the electrical apparatuses include a TV, a refrigerator, a washing machine, and an air conditioner. The electrical apparatus group 13 may be expressed as in-house electric power loads, simply loads, or the like.

The vehicle connection mechanism 14 is configured to be able to connect a vehicle 2 to the building 1. The inverter 12 described above can perform selective bidirectional electric power supply between the building 1 and the vehicle 2 via the vehicle connection mechanism 14. That is, the inverter 12 includes a converter that converts an electric power into an electric power available for the electric power supply between the building 1 and the vehicle 2, and with the converter, the inverter 12 performs electric power supply from the electric power line 19 to the vehicle 2 and electric power supply from the vehicle 2 to the electric power line 19, selectively via the vehicle connection mechanism 14. The mechanism 14 may be expressed as a connection terminal, simply a terminal, or the like. In FIG. 1, the vehicle connection mechanism 14 is illustrated as a part of the building 1 for ease of description, but note that a part/a whole of the vehicle connection mechanism 14 can be installed in the open air (e.g., in a parking area).

The electric power management device 15 is configured to manage electric power in the building 1 while monitoring a state of the electric power line 19 with, for example, an ammeter or the like, and is configured to be able to issue commands to perform the electric power supply between the building 1 and the vehicle 2 based on, for example, the supply-demand balance of the electric power in the building 1, which will be described below in detail. In the present embodiment, the electric power management device 15 includes a central processing unit (CPU), a memory, and an interface for communication and is configured to perform the electric power management according to a given program, but functions of the electric power management device 15 can be implemented in a form of either software or hardware. In addition, the electric power management device 15 includes a communication device, with which the electric power management device 15 is configured to be able to perform communication between the building 1 and the vehicle 2 via the vehicle connection mechanism 14.

Here, constituent elements in the building 1 are described individually for distinguishing their functions from one another, but note that the constituent elements are not limited to the configuration in this example, and some of them may be formed of a single unit, or some constituent element may be formed of a plurality of units. For example, the inverter 12 and the electric power management device 15 may be each formed in a single unit, and some of functions of the vehicle connection mechanism 14 may be implemented in the inverter 12.

The vehicle 2 is an electric vehicle (EV) including a battery 21 in the present embodiment and further includes a charge-and-discharge unit 22, an auxiliary battery 23, a converter 24, and a control unit 25. For the battery 21, for example, a lithium-ion battery having an output voltage of about 200 [V] is used. The charge-and-discharge unit 22 includes a bidirectional inverter, a relay, and the like, and is configured to be able to perform the selective bidirectional electric power supply between the building 1 and the vehicle 2 through electrical connection of the vehicle 2 to the building 1 by the vehicle connection mechanism 14. For example, the charge-and-discharge unit 22 supplies electric power of the electric power line 19 to the battery 21 (charges the battery 21) and supplies electric power of the battery 21 to the electric power line 19 (discharges the battery 21).

For the auxiliary battery 23, a lead-acid battery having an output voltage of about 12 [V] can be used, for example. The converter 24 is configured to convert the electric power of the battery 21 into an electric power available for the auxiliary battery 23, enabling the auxiliary battery 23 to be charged. That is, the auxiliary battery 23 receives electric power from the battery 21 and stores the electric power.

A relationship between the battery 21 and the auxiliary battery 23 is as follows: for both of them, secondary batteries are used, and the battery 21 has a main function of serving as an electric power source for driving a motive power source (e.g., an electric motor such as a three-phase induction motor, etc.) of the vehicle 2. In contrast, the auxiliary battery 23 has a main function of serving as an auxiliary electric power source for driving electrical equipment of the vehicle 2 (e.g., the control unit 25 described below, etc.). For distinction from the auxiliary battery 23, the battery 21 may be expressed as a main battery.

In the present embodiment, the auxiliary battery 23 is configured to be able to be charged with the electric power of the battery 21 while the charge-and-discharge unit 22 is charging the battery 21. In another embodiment, the auxiliary battery 23 may be configured to be able to be charged with the electric power of the battery 21 while the vehicle 2 is traveling, and this configuration is preferable in a case where the vehicle 2 is what is called a hybrid vehicle.

The control unit 25 is brought into an operating state by electric power of the auxiliary battery 23 and controls driving of the charge-and-discharge unit 22 while communicating with the electric power management device 15. For example, the control unit 25 being in the operating state controls the driving of the charge-and-discharge unit 22 in response to signals from the electric power management device 15, thereby performing charging and discharging of the battery 21, which will be described below in detail. The control unit 25 is configured to be in a suspended state (in a substantially non-operating state) while the charging and discharging of the battery 21 is not performed.

Note that, in the present embodiment, the electrical connection between the building 1 and the vehicle 2 is assumed to be provided by a single cable in the vehicle connection mechanism 14. It is assumed that this provides both of the electrical connection between the electric power line 19 and the battery 21 via the charge-and-discharge unit 22, and the communication between the electric power management device 15 and the control unit 25.

The system SY described above enables the electric power in the building 1 to be managed appropriately in accordance with the supply-demand balance in the building 1, and from another viewpoint, the system SY enables a reduction of the purchase of the electric power from the electric power system 9 by utilizing the battery 21 of the vehicle 2 electrically connected to the building 1. For example, in a case where a demand of the electric power in the building 1 is higher than a supply of the electric power, the battery 21 is discharged, and in a case where the demand of the electric power in the building 1 is lower than the supply of the electric power, the battery 21 is charged, which will be described below in detail. The system SY can be referred to as a Vehicle-to-Home (V2H) control system or the like.

A possible case after the battery 21 is brought into an available state by the electrical connection of the vehicle 2 to the building 1 as described above is such that, for example, use of the vehicle 2 becomes necessary against an expectation of the user (irrespective of a plan of the user). It is thus conceivable that a user specifies in advance a range that is to be satisfied by a charging rate of the battery 21, as a target range (referred to as a range R0). This enables the battery 21 to be utilized appropriately while the vehicle 2 is electrically connected to the building 1, that is, the selective bidirectional electric power supply between the building 1 and the vehicle 2 can be performed while keeping the charging rate of the battery 21 within the target range R0.

The charging rate indicates a proportion of a remaining capacity to a battery capacity of the battery 21 and can be expressed as a state of charge (SOC). The user is typically an owner of the vehicle 2 but may be a person related to the user or a third person who uses the vehicle 2 temporarily.

Figure 2A:
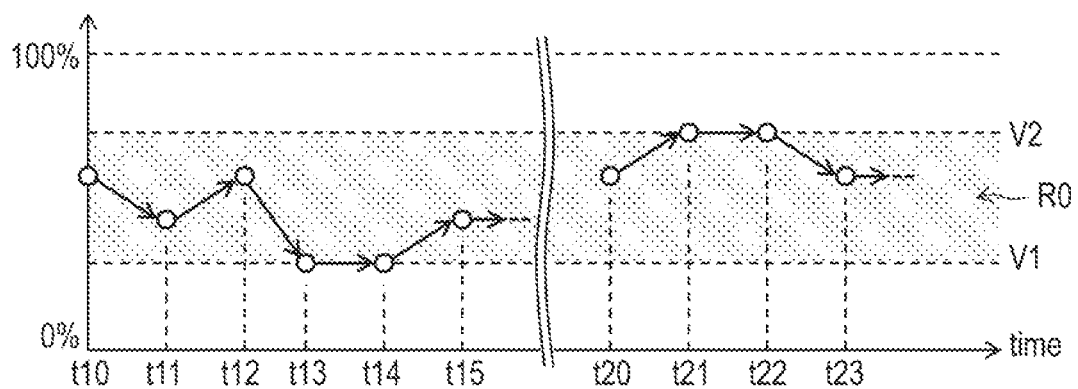
FIG. 2A is a timing chart used for describing an example of an aspect of electric power management.
Figure 2A:
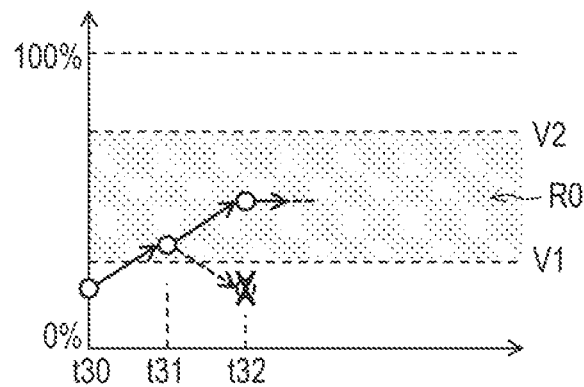
Figure 2A:
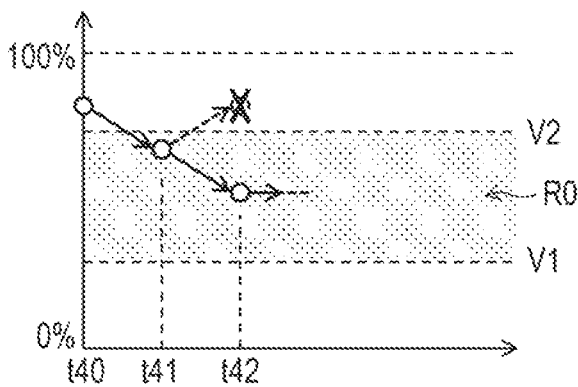
Figure 2A:
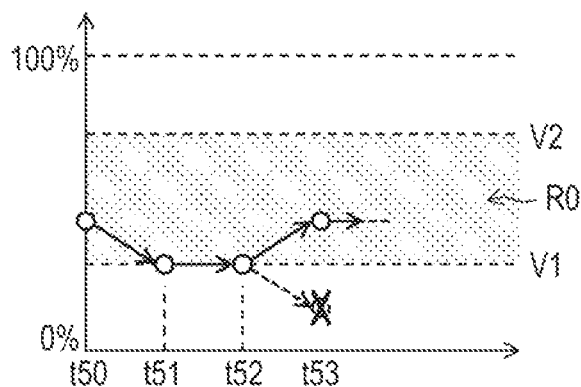
Figure 2A:
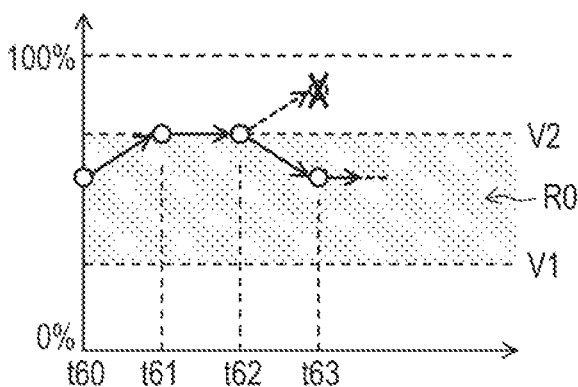

FIG. 2A is a timing chart used for describing an example of an electric power management method performed by the electric power management device 15. In the chart, its ordinate indicates the charging rate of the battery 21 (0 to 100 [%]). In the chart, its abscissa is set to be a time axis. As described above, the user can specify the target range R0 that is to be satisfied by the charging rate. The target range R0 may be expressed as an allowable range of utilization, simply an allowable range, or the like.

Of the target range R0, a lower-limit value V1 and an upper-limit value V2 can be specified optionally by the user. As an example, the lower-limit value V1 can be specified to be 20 [%] (an equivalent numeric value), and the upper-limit value V2 can be specified to be 80 [%] (an equivalent numeric value). In another example, the lower-limit value V1 may be specified to be 50 [%] (an equivalent numeric value), and the upper-limit value V2 may be specified to be 100 [%] (an equivalent numeric value).

First, assume that the charging rate of the battery 21 is within the target range R0 at time point t10, at which the battery 21 is brought into the available state by electrical connection of the vehicle 2 to the building 1. Afterward, charging and discharging of the battery 21 is performed while keeping the charging rate of the battery 21 within the target range R0, and in a case where the charging rate of the battery 21 is to fall out of the target range R0 (or in a case where the charging rate has fallen out of the range R0), the charging and discharging is stopped, and the battery 21 is utilized in this manner.

For example, assume that, in a period from time point t10 to t11, a power consumption of the electrical apparatus group 13 (a demand of the electric power) in the building 1 is higher than electric power generated by the power generator 11 (a supply of the electric power). According to this, the battery 21 is to be discharged in the present embodiment (i.e., a shortage of electric power in the building 1 is to be compensated for by the electric power of the battery 21), and no electric power is purchased from the electric power system 9 in this example. As a result, the charging rate of the battery 21 drops.

Assume that, in a subsequent period from time point t11 to t12, the power consumption in the building 1 becomes lower than the electric power generated by the power generator 11 (demand<supply). According to this, the battery 21 is charged in the present embodiment (i.e., a surplus of the electric power in the building 1 is supplied to the battery 21). As a result, the charging rate of the battery 21 rises.

Assume that, in a subsequent period from time point t12 to t13, the power consumption in the building 1 becomes greatly higher than the electric power generated by the power generator 11 (demand>supply). This causes discharging of the battery 21 as in the period from time point t10 to t11, and it is assumed here that the charging rate of the battery 21 reaches the lower-limit value V1 as a result. If the discharging of the battery 21 is performed (if a shortage of the electric power is compensated for by the electric power of the battery 21) as it is, the charging rate of the battery 21 consequently falls out of the target range R0. In this case, therefore, the discharging of the battery 21 is stopped, and electric power is purchased from the electric power system 9 and used to compensate for the shortage of the electric power in the building 1.

In a subsequent period from time point t13 to t14, during which the power consumption in the building 1 becomes lower than the electric power generated by the power generator 11 (during which the supply-demand balance of the electric power in the building 1 is reversed), the charging rate of the battery 21 is to indicate the lower-limit value V1.

Assume that, in a subsequent period from time point t14 to t15, the power consumption in the building 1 becomes lower than the electric power generated by the power generator 11 (demand<supply). This causes charging of the battery 21 as in the period from time point t11 to t12.

Additionally, assume that, in a more subsequent period from time point t20 to t21, the power consumption in the building 1 becomes lower than the electric power generated by the power generator 11 (demand<supply). This causes charging of the battery 21 as in the period from time point t11 to t12, and it is assumed here that the charging rate of the battery 21 reaches the upper-limit value V2 as a result. If the charging of the battery 21 is performed as it is, the charging rate of the battery 21 consequently falls out of the target range R0. Therefore, the charging of the battery 21 is stopped in such a case. In this case, a surplus of the electric power in the building 1 may be stored in another storage battery or the like (not illustrated) in the building 1 or may be purchased by an electric power company.

In a subsequent period from time point t21 to t22, during which the power consumption in the building 1 becomes higher than the electric power generated by the power generator 11 (during which the supply-demand balance of the electric power in the building 1 is reversed), the charging rate of the battery 21 is to indicate the upper-limit value V2.

Assume that, in a subsequent period from time point t22 to t23, the power consumption in the building 1 becomes higher than the electric power generated by the power generator 11 (demand>supply). This causes discharging of the battery 21 as in the period from time point t10 to t11. In such a manner, the battery 21 is utilized by the charging and discharging.

Briefly, while the vehicle 2 is electrically connected to the building 1, the electric power management device 15 utilizes the battery 21 in accordance with the supply-demand balance of the electric power in the building 1. For example, the electric power management device 15 performs the charging and discharging of the battery 21 while keeping the charging rate of the battery 21 within the target range R0, and stops the charging and discharging in a case where the charging rate of the battery 21 is to fall out of the target range R0 (or in a case where the charging rate has fallen out of the range R0).

In such a manner, the electric power management system SY manages the electric power in the building 1 by utilizing the battery 21 of the vehicle 2 to restrain use of the electric power of the electric power system 9. Here, the target range R0 is specified in advance in preparation for a case where use of the vehicle 2 becomes necessary against an expectation of the user. Therefore, the utilization of the battery 21 is to be performed in a period prior to a time point at which the user plans use of the vehicle 2, and the charging of the battery 21 is to be completed such that the charging rate of the battery 21 reaches a desired value (a value at least not less than the lower-limit value V1, preferably not less than the upper-limit value V2, e.g., 100 [%], etc.) at the planned time point.

Referring to FIG. 1 again, the control unit 25 is brought into the operating state by the electric power of the auxiliary battery 23 and performs the charging and discharging of the battery 21 by controlling the driving of the charge-and-discharge unit 22 based on the communication with the electric power management device 15. In contrast, while the charging and discharging of the battery 21 is not performed, the control unit 25 is in the suspended state, and consumption of the electric power of the auxiliary battery 23 is suppressed. Putting this in other words from a viewpoint of the electric power management device 15, at a time of starting the charging and discharging of the battery 21, the electric power management device 15 causes the control unit 25 to operate on the electric power of the auxiliary battery 23 and issues commands to start the charging and discharging to the control unit 25 being in the operating state. Afterward, the electric power management device 15 controls the driving of the charge-and-discharge unit 22 with the control unit 25 being in the operating state to utilize the battery 21 in accordance with the supply-demand balance of the electric power in the building 1 (continues the charging and discharging).

Here, in the utilization of the battery 21 described above, in a case where the charging rate of the battery 21 is not more than the lower-limit value V1 or not less than the upper-limit value V2, of the target range R0, there is a possible situation in which start and stop of the charging and discharging of the battery 21 are repeated unnecessarily. In such a case, the control unit 25 is caused to operate unnecessarily, and accordingly, the electric power of the auxiliary battery 23 is consumed unnecessarily. This will be described below with reference to FIG. 2B1 to FIG. 2C2.

FIG. 2B1 illustrates an example of a case where the charging rate of the battery 21 is lower than the lower-limit value V1 of the target range R0 at time point t30, at which the vehicle 2 is electrically connected to the building 1, as an example. In this case, in order to bring the charging rate of the battery 21 within the target range R0, electric power is purchased from the electric power system 9, and the battery 21 is charged with the purchased electric power. As alternative/subsidiary measures, in a case where the power consumption in the building 1 is lower than the electric power generated by the power generator 11 (where demand<supply), a surplus of the electric power in the building 1 may be used to charge the battery 21. In this example, in a period from time point t30 to t31, the charging rate of the battery 21 increases to fall within the target range R0, which brings the battery 21 into the available state.

Afterward, in a case where the power consumption in the building 1 is lower than the electric power generated by the power generator 11 (where demand<supply) in a period from time point t31 to t32, the charging of the battery 21 is continued, as illustrated by a solid line.

In contrast, in a case where the power consumption in the building 1 is higher than the electric power generated by the power generator 11 (where demand>supply) in a period from time point t31 to t32, the charging of the battery 21 is stopped, and discharging of the battery 21 is then started, as illustrated by a broken line. In this example, however, while the charging rate of the battery 21 falls within the target range R0 in the period from time point t30 to t31, the charging rate is not sufficiently higher than the lower-limit value V1. Therefore, immediately after the discharging of the battery 21 is started, the charging rate of the battery 21 reaches the lower-limit value V1, and accordingly, the discharging is stopped. In addition, at that time, the control unit 25 is caused to operate unnecessarily, and consequently, the electric power of the auxiliary battery 23 is consumed unnecessarily. Hence, it is preferable in such a case that the discharging of the battery 21 is not started from the beginning.

FIG. 2B2 illustrates an example of a case where the charging rate of the battery 21 is higher than the upper-limit value V2 of the target range R0 at time point t40, at which the vehicle 2 is electrically connected to the building 1, as another example. In this case, discharging of the battery 21 can be performed, which enables the charging rate of the battery 21 to fall within the target range R0. That is, in a case where the power consumption in the building 1 is higher than the electric power generated by the power generator 11 (where demand>supply), a shortage of the electric power in the building 1 can be compensated for by the electric power of the battery 21 without purchasing electric power from the electric power system 9. In this example, in a period from time point t40 to t41, the charging rate of the battery 21 decreases to fall within the target range R0, which thereafter brings the battery 21 into the available state in a process similar to that illustrated in FIG. 2A.

In a case where the power consumption in the building 1 is higher than the electric power generated by the power generator 11 (where demand>supply) in a subsequent period from time point t41 to t42, the discharging of the battery 21 is continued, as illustrated by a solid line.

In contrast, in a case where the power consumption in the building 1 is lower than the electric power generated by the power generator 11 (where demand<supply) in a period from time point t41 to t42, the discharging of the battery 21 is stopped, and charging of the battery 21 is started, as illustrated by a broken line. In this example, however, while the charging rate of the battery 21 falls within the target range R0 in the period from time point t40 to t41, the charging rate is not sufficiently lower than the upper-limit value V2. Therefore, immediately after the charging of the battery 21 is started, the charging rate of the battery 21 reaches the upper-limit value V2, and the charging is to be stopped accordingly. In addition, at that time, the control unit 25 is caused to operate unnecessarily, and consequently, the electric power of the auxiliary battery 23 is consumed unnecessarily. Therefore, it is preferable in such a case that the charging of the battery 21 is not started from the beginning.

FIG. 2C1 illustrates an example of a case where, discharging of the battery 21 is performed in a period from time point t50 to t51 because the power consumption in the building 1 becomes higher than the electric power generated by the power generator 11 (demand>supply), so that the charging rate of the battery 21 reaches the lower-limit value V1, as still another example. In a subsequent period from time point t51 to t52, during which the power consumption in the building 1 becomes lower than the electric power generated by the power generator 11 (during which the supply-demand balance of the electric power in the building 1 is reversed), the charging rate of the battery 21 indicates the lower-limit value V1.

In a case where the power consumption in the building 1 is lower than the electric power generated by the power generator 11 (where demand<supply) in a subsequent period from time point t52 to t53, the charging of the battery 21 is started, as illustrated by a solid line.

In contrast, in a case where the power consumption in the building 1 is higher than the electric power generated by the power generator 11 (where demand>supply) in a period from time point t52 to t53, the discharging of the battery 21 is required to be started again, as illustrated by a broken line. However, if the discharging is started, the charging rate of the battery 21 falls out of the target range R0, and the discharging is thus going to be stopped immediately. Therefore, also in such a case, the control unit 25 is caused to operate unnecessarily, and consequently the electric power of the auxiliary battery 23 is consumed unnecessarily. Hence, it is preferable in such a case that the discharging of the battery 21 is not started from the beginning.

FIG. 2C2 illustrates an example of a case where charging of the battery 21 is performed in a period from time point t60 to t61 because the power consumption in the building 1 becomes lower than the electric power generated by the power generator 11 (demand<supply), so that the charging rate of the battery 21 reaches the upper-limit value V2, as still another example. In a subsequent period from time point t61 to t62, during which the power consumption in the building 1 becomes higher than the electric power generated by the power generator 11 (during which the supply-demand balance of the electric power in the building 1 is reversed), the charging rate of the battery 21 indicates the upper-limit value V2.

In a case where the power consumption in the building 1 is higher than the electric power generated by the power generator 11 (where demand>supply) in a subsequent period from time point t62 to t63, discharging of the battery 21 is to be started, as illustrated by a solid line.

In contrast, in a case where the power consumption in the building 1 is lower than the electric power generated by the power generator 11 (where demand<supply) in a period from time point t62 to t63, the charging of the battery 21 is required to be started again, as illustrated by a broken line. However, if the charging is started, the charging rate of the battery 21 falls out of the target range R0, and thus the charging is to be stopped immediately. Therefore, also in such a case, the control unit 25 is caused to operate unnecessarily, and consequently the electric power of the auxiliary battery 23 is consumed unnecessarily. Therefore, it is preferable in such a case that the charging of the battery 21 is not started from the beginning.

That is, in the examples illustrated in FIG. 2B1 to FIG. 2C2, there is a possibility that the charging and discharging of the battery 21 are repeated unnecessarily in the utilization of the battery 21 described above. As a result, it is possible that the electric power of the auxiliary battery 23 is depleted, making the control unit 25 unavailable to operate, which makes the driving of the charge-and-discharge unit 22 unavailable to be controlled, bringing the battery 21 into an unavailable state.

Figure 3:
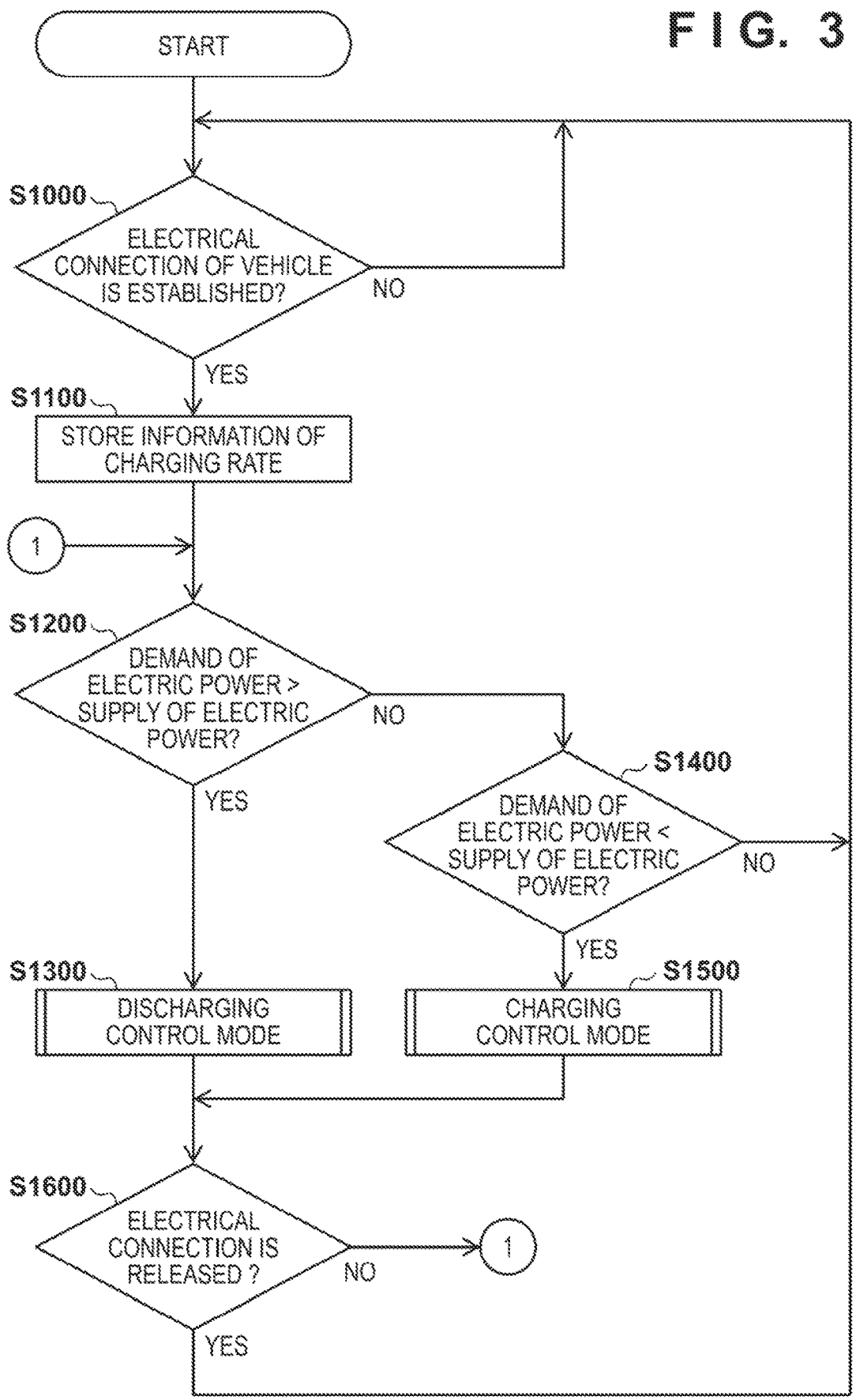
FIG. 3 is a flowchart used for describing an example of an electric power management method according to an embodiment.
Figure 4:
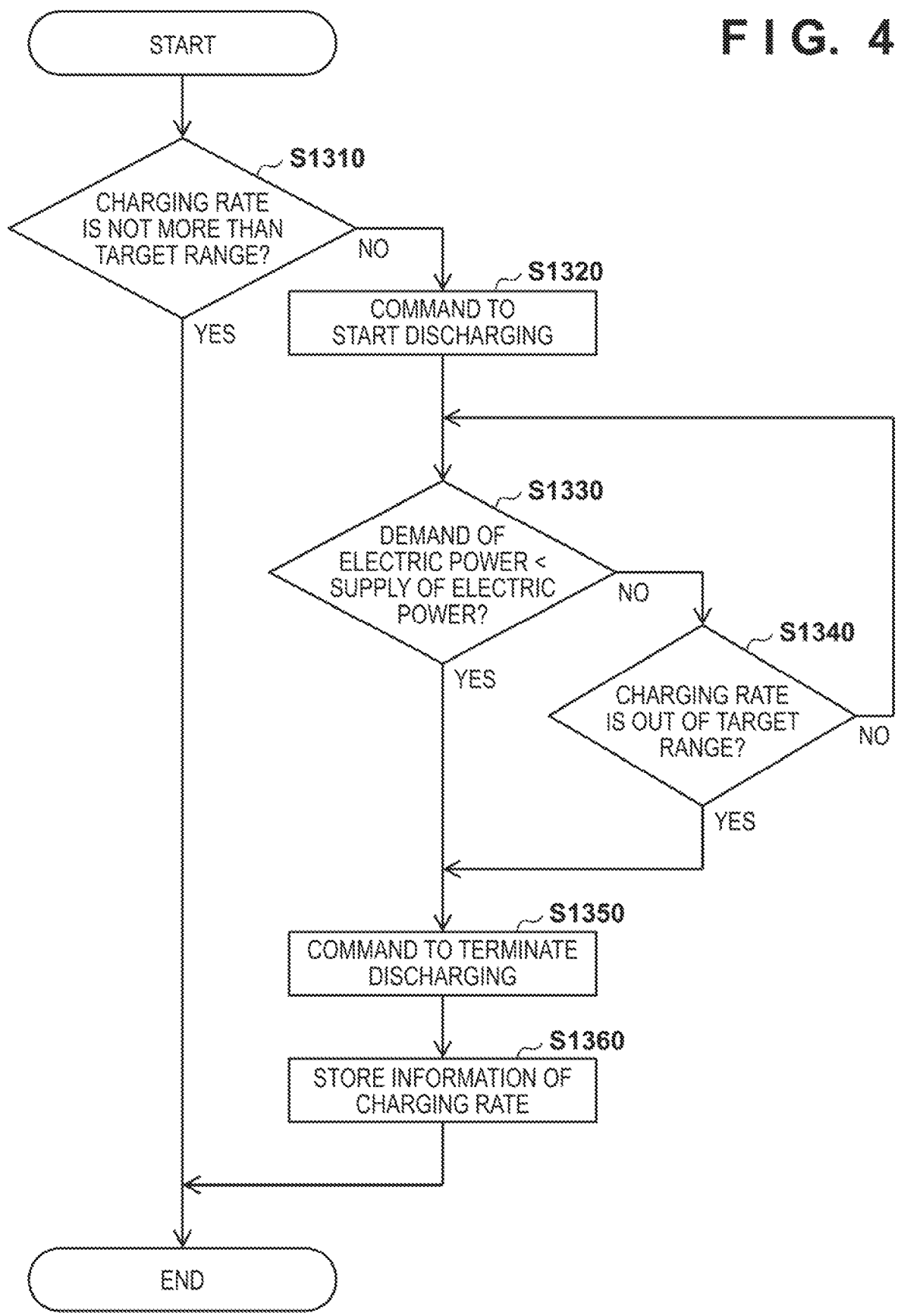
FIG. 4 is a flowchart used for describing the example of the electric power management method according to the embodiment.

FIG. 3 to FIG. 5 are flowcharts each used for describing an example of an electric power management method for preventing the situation described above, the method being performed by the electric power management device 15.

FIG. 3 is a flowchart illustrating the electric power management method performed by the electric power management device 15; an outline of the electric power management method is as follows: as the vehicle 2 is electrically connected to the building 1, the electric power management device 15 performs the charging and discharging of the battery 21 in accordance with the supply-demand balance of the electric power in the building 1. Steps of this method are assumed to be implemented mainly by the electric power management device 15.

In step S1000 (hereinafter, referred to simply as "S1000," this applies to other steps to be described below), whether the electrical connection between the building 1 and the vehicle 2 has established is determined (see FIG. 1). It will suffice to make this determination in accordance with whether the cable of the vehicle connection mechanism 14 has been connected to the vehicle 2. By the electrical connection between the building 1 and the vehicle 2, the electric power line 19 and the battery 21 are electrically connected to each other via the charge-and-discharge unit 22, which enables communication between the electric power management device 15 and the control unit 25 to be performed. In a case where the electrical connection between the building 1 and the vehicle 2 has been established, the flow proceeds to S1100, or otherwise, the flow returns to S1000.

In S1100, the electric power management device 15 accepts/receives information indicating the charging rate of the battery 21 from the control unit 25 by the communication between the electric power management device 15 and the control unit 25, and stores the information in a memory of the electric power management device 15. In addition, from the control unit 25, the electric power management device 15 accepts/receives information indicating the target range R0, which is specified in advance by a user for the vehicle 2, and the electric power management device 15 specifies the target range R0 as a parameter used for utilizing the battery 21. Afterward, the control unit 25 is brought into the suspended state, and then the flow proceeds to S1200.

In S1200, the supply-demand balance of the electric power in the building 1 is determined. It will suffice to make the determination by monitoring the state of the electric power line 19 using, for example, an ammeter or the like. Here, whether a supply of the electric power in the building 1 is higher than a demand of the electric power is determined. As described with reference to FIG. 1 and FIG. 2A, the demand indicates the power consumption of the electrical apparatus group 13, and the supply indicates the electric power generated by the power generator 11. In a case where the demand of the electric power in the building 1 is higher than the supply of the electric power, the flow proceeds to S1300, or otherwise, the flow proceeds to S1400.

In S1300, an operation mode of the electric power management device 15 is switched to a discharging control mode. As the demand of the electric power in the building 1 is determined to be higher than the supply of the electric power in S1200, the battery 21 is discharged, which will be described below in detail.

In S1400, the supply-demand balance of the electric power in the building 1 is further determined. It will suffice to make the determination as in S1200. Here, whether the demand of the electric power in the building 1 is lower than the supply of the electric power is determined. In a case where the demand is lower than the supply, the flow proceeds to S1500, or otherwise, the flow returns to S1000.

In S1500, the operation mode of the electric power management device 15 is switched to a charging control mode. As the demand of the electric power in the building 1 is determined to be lower than the supply of the electric power in S1400, the battery 21 is charged, which will be described below in detail.

That is, S1200, S1300, S1400, and S1500 can be considered to be steps by which the utilization of the battery 21 of the vehicle 2 by the electric power management system SY is implemented. Although S1200 and S1400 are distinguished from each other for convenience of description, note that they may be performed substantially at the same time.

In S1600, whether the electrical connection between the building 1 and the vehicle 2 has been released is determined. It will suffice to make the determination as in S1000. In a case where the electrical connection between the building 1 and the vehicle 2 has been released, the flow returns to S1000, or otherwise, the flow proceeds to S1200 to continue the utilization of the battery 21. Note that this flowchart is terminated by a planned time point at which the user uses the vehicle 2, and the battery 21 can be charged up to a desired charging rate, which is not described above.

FIG. 4 is a flowchart illustrating a control method in the discharging control mode of the electric power management device 15 (see S1300). An outline of the control method is as follows: the electric power management device 15 acquires information indicating the charging rate of the battery 21 stored in the memory of the electric power management device 15 and issues a command to start discharging of the battery 21 or restrains the issuance of the command, in accordance with the charging rate.

In S1310, whether the charging rate of the battery 21 stored in the memory of the electric power management device 15 is not more than the target range R0 described above (not more than the lower-limit value V1) is determined. For example, immediately after the vehicle 2 is electrically connected to the building 1, the charging rate of the battery 21 stored in the memory of the electric power management device 15 is referred to in S1100, and whether the stored charging rate is not more than the lower-limit value V1 is determined. In a case where the stored charging rate of the battery 21 is not more than the lower-limit value V1, this flowchart is terminated (the flow proceeds to S1600 illustrated in FIG. 3 with the issuance of the command to start the discharging of the battery 21 being restrained/not performed), or otherwise, the flow proceeds to S1320.

In S1310, since the charging rate of the battery 21 is acquired from the memory, the charging rate does not have to be acquired from the control unit 25 by the communication between the electric power management device 15 and the control unit 25. The control unit 25 can be therefore kept in the suspended state, that is, there is no need to cause the control unit 25 to operate, and thus substantially no electric power of the auxiliary battery 23 is consumed.

In S1320, the electric power management device 15 issues the command to start the discharging of the battery 21, that is, issues a command to start electric power supply from the battery 21 of the vehicle 2 to the electric power line 19 of the building 1. This corresponds to details of the periods such as from time point t10 to t11, from t12 to t13, from t22 to t23, and the like illustrated in FIG. 2A. The discharging of the battery 21 is started after the control unit 25 is caused to operate on the electric power of the auxiliary battery 23, by the control unit 25 being in the operating state controlling the driving of the charge-and-discharge unit 22.

In S1330, whether the demand of the electric power in the building 1 has become lower than the supply of the electric power (the supply-demand balance of the electric power in the building 1 has been reversed) is determined. In a case where the demand has become lower than the supply, the flow proceeds to S1350, or otherwise, the flow returns to S1340.

In S1340, whether the charging rate of the battery 21 has fallen out of the target range R0 (not more than the lower-limit value V1 or not less than the upper-limit value V2) is determined. The determination is performed by acquisition of a present charging rate (a charging rate at that time point) of the battery 21 from the control unit 25 being in the operating state, by the communication between the electric power management device 15 and the control unit 25. That is, this is not a case that the charging rate of the battery 21 is acquired from the memory. In a case where the charging rate of the battery 21 has fallen out of the target range R0, the flow proceeds to S1350, or otherwise, the flow returns to S1330.

In S1350, the electric power management device 15 issues a command to terminate the discharging of the battery 21, that is, issues a command to terminate electric power supply from the battery 21 of the vehicle 2 to the electric power line 19 of the building 1. Afterward, in S1360, the charging rate of the battery 21 at a time of issuing the command to start the discharging (in S1320) or at a time of starting the discharging is stored in the memory of the electric power management device 15 (the information stored in the memory is updated). Afterward, the flowchart is terminated (the flow proceeds to S1600 illustrated in FIG. 3) after the control unit 25 is brought into the suspended state.

FIG. 5 is a flowchart illustrating a control method in the charging control mode of the electric power management device 15 (see S1500). An outline of the control method is as follows: the electric power management device 15 acquires information indicating the charging rate of the battery 21 stored in the memory of the electric power management device 15 and issues a command to start charging of the battery 21 or restrains the issuance of the command, in accordance with the charging rate.

In S1510, whether the charging rate of the battery 21 stored in the memory of the electric power management device 15 is not less than the target range R0 described above (not less than the upper-limit value V2) is determined. For example, immediately after the vehicle 2 is electrically connected to the building 1, the charging rate of the battery 21 stored in the memory of the electric power management device 15 is referred to in S1100, and whether the stored charging rate is not less than the upper-limit value V2 is determined. In a case where the stored charging rate of the battery 21 is not less than the upper-limit value V2, this flowchart is terminated (the flow proceeds to S1600 illustrated in FIG. 3 with the issuance of the command to start the charging of the battery 21 being restrained/not performed), or otherwise, the flow proceeds to S1520.

In S1510, since the charging rate of the battery 21 is acquired from the memory as in S1310, the charging rate does not have to be acquired from the control unit 25 by the communication between the electric power management device 15 and the control unit 25. The control unit 25 can be therefore kept in the suspended state, that is, there is no need to cause the control unit 25 to operate, and thus substantially no electric power of the auxiliary battery 23 is consumed.

In S1520, the electric power management device 15 issues the command to start the charging of the battery 21, that is, issues a command to start electric power supply from the electric power line 19 of the building 1 to the battery 21 of the vehicle 2. This corresponds to details of the periods such as from time point t11 to t12, from t14 to t15, from t20 to t21, and the like illustrated in FIG. 2A. The charging of the battery 21 is started after the control unit 25 is caused to operate on the electric power of the auxiliary battery 23, by the control unit 25 being in the operating state controlling the driving of the charge-and-discharge unit 22.

In S1530, whether the demand of the electric power in the building 1 has become higher than the supply of the electric power (the supply-demand balance of the electric power in the building 1 has been reversed) is determined. In a case where the demand has become higher than the supply, the flow proceeds to S1550, or otherwise, the flow returns to S1540.

In S1540, whether the charging rate of the battery 21 has fallen out of the target range R0 (not more than the lower-limit value V1 or not less than the upper-limit value V2) is determined. The determination is performed by acquisition of the present charging rate of the battery 21 from the control unit 25 being in the operating state, by the communication between the electric power management device 15 and the control unit 25. That is, this is not a case that the charging rate of the battery 21 is acquired from the memory. In a case where the charging rate of the battery 21 has fallen out of the target range R0, the flow proceeds to S1550, or otherwise, the flow returns to S1530.

In S1550, the electric power management device 15 issues a command to terminate the charging of the battery 21, that is, issues a command to terminate the electric power supply from the electric power line 19 of the building 1 to the battery 21 of the vehicle 2. Afterward, in S1560, the charging rate of the battery 21 at a time of issuing the command to start the charging (in S1520) or at a time of starting the charging is stored in the memory of the electric power management device 15 as in S1360, and in addition, the flowchart is terminated (the flow proceeds to S1600 illustrated in FIG. 3) after the control unit 25 is brought into the suspended state.

In the above manner, the electric power management device 15 utilizes the battery 21 in accordance with the supply-demand balance of the electric power in the building 1 to restrain the use of the electric power of the electric power system 9, thereby enabling the management of the electric power in the building 1.

Briefly, as the vehicle 2 is electrically connected to the building 1 (S1000), the electric power management device 15 first accepts the information indicating the charging rate of the battery 21 from the control unit 25, stores the information in the memory, and in addition, specifies the target range R0 that is to be satisfied by the charging rate (S1100). Afterward, the electric power management device 15 performs the charging and discharging of the battery 21 with the control unit 25 and the charge-and-discharge unit 22, thereby utilizing the battery 21 while keeping the charging rate of the battery 21 within the target range R0 (S1200, S1300, S1400, and S1500).

In issuing the commands to perform the charging and discharging of the battery 21, the electric power management device 15 accepts the information indicating the charging rate of the battery 21 at times of starting the charging and discharging from the control unit 25 and updates the information in the memory, after the issuance (S1360 and S1560). For example, at a time when the electric power management device 15 issues commands to stop the charging and discharging in response to changes in the supply-demand balance of the electric power in the building 1, the electric power management device 15 performs the update based on the charging rate of the battery 21 at the times of starting the charging and discharging.

Then, the electric power management device 15 determines whether to perform the charging and discharging, based on whether the charging rate of the battery 21 indicated by the information stored in the memory falls out of the target range R0 (S1310 and S1510). At that time, since there is no need to acquire the charging rate of the battery 21 from the control unit 25, the electric power management device 15 can bring the control unit 25 into the suspended state in a case where the charging and discharging is not performed.

The charging rate of the battery 21 indicated by the information stored in the memory is different from the present charging rate of the battery 21 and can be considered to be a last value that can be referred to for new charging and discharging. From this viewpoint, assume that the information stored in the memory (the information indicating the charging rate of the battery 21) can be updated in other aspects.

For example, in a case where the battery 21 is charged in such a manner that the charging rate of the battery 21 monotonically increases over the substantially entire target range R0, there can be a situation in which the information stored in the memory indicates a value of the charging rate at the lower-limit value V1 or a value in proximity to the lower-limit value V1 although the present charging rate of the battery 21 shows the upper-limit value V2 or a value in proximity to the upper-limit value V2. Alternatively, in a case where the battery 21 is discharged in such a manner that the charging rate of the battery 21 monotonically decreases over the substantially entire target range R0, there can be a situation in which the information stored in the memory indicates a value of the charging rate at the upper-limit value V2 or a value in proximity to the upper-limit value V2 although the present charging rate of the battery 21 shows the lower-limit value V1 or a value in proximity to the lower-limit value V1. Therefore, when a predetermined time period elapses since the charging and discharging is started/when the charging rate changes by a predetermined amount, it is possible that the electric power management device 15 performs the update based on the charging rate of the battery 21 at the time, and thereafter continues the charging and discharging.

According to the present embodiment, the electric power management device 15 can appropriately manage the electric power of the battery 21 of the vehicle 2 electrically connected to the building 1 in accordance with the supply-demand balance of the electric power in the building 1. The electric power management device 15 issues commands to perform the charging and discharging of the battery 21, specifies the target range R0 for the charging rate of the battery 21 in performing the charging and discharging, and stores the charging rate of the battery 21 in performing the charging and discharging. In addition, in issuing the commands to perform the charging and discharging, in a case where the charging rate stored in (the memory of) the electric power management device 15 is not more than the lower-limit value V1 of the target range R0, the electric power management device 15 restrains an issuance of a command to start discharging of the battery 21. In contrast, in a case where the charging rate stored in the electric power management device 15 is not less than the upper-limit value V2 of the target range R0, the electric power management device 15 restrains an issuance of a command to start charging of the battery 21. Therefore, according to the present embodiment, unnecessary performance of charging and discharging, such as terminating charging and discharging of the battery 21 immediately after starting the charging and discharging, can be restrained, which enables appropriate utilization of the battery 21 of the vehicle 2 electrically connected to the building 1. Note that, the above-mentioned device 15 can be described as an apparatus, an equipment, a unit, or the like.

In the above description, the constituent elements are denoted by names relating to their functional aspects for ease of understanding, but the constituent elements are not limited to those having what they are described in the embodiment as their main functions, and may be those that have what they are described in the embodiment as their auxiliary functions.

Some of features of the embodiment will be summarized as follows.

A first aspect relates to an electric power management device (e.g., 15), and the electric power management device is an electric power management device that manages electric power in a building (e.g., 1) configured to be electrically connectable to a vehicle (e.g., 2) including a battery (e.g., 21), and includes: a command issuing unit (e.g., S1320 and S1520) configured to issue a command to perform charging and discharging of the battery; a specifying unit (e.g., S1100) configured to specify a target range (e.g., R0) for a charging rate of the battery in the charging and discharging; and a storage unit (e.g., S1100, S1360, and S1560) configured to store the charging rate of the battery in performing the charging and discharging, wherein in a case where the charging rate stored in the storage unit is not more than a lower-limit value (e.g., V1) of the target range, the command issuing unit restrains an issuance of a command to start discharging of the battery, and in a case where the charging rate is not less than an upper-limit value (e.g., V2) of the target range, the command issuing unit restrains an issuance of a command to start charging of the battery (e.g., S1310 and S1510). The first aspect makes it possible to restrain unnecessary performance of the charging and discharging of the battery of the vehicle electrically connected to the building while utilizing the battery. For example, the first aspect makes it possible to restrain such an unnecessary performance of discharging that discharging of the battery is terminated immediately after its start in a case where the stored charging rate of the battery is not more than the lower-limit value of the target range. In addition, for example, the first aspect makes it possible to restrain such an unnecessary performance of charging that charging of the battery is terminated immediately after its start in a case where the stored charging rate of the battery is not less than the upper-limit value of the target range.

In a second aspect, in a case where the charging rate stored in the storage unit falls within the target range, the command issuing unit continues the charging and discharging while keeping the charging rate of the battery within the target range, and in a case where the charging rate of the battery falls out of the target range, the command issuing unit issues a command to stop the charging and discharging (e.g., S1340 and S1540). The second aspect makes it possible to utilize the battery appropriately.

In a third aspect, the vehicle includes: a charge-and-discharge unit (e.g., 22) configured to be able to perform charging from the building to the battery and discharging from the battery to the building; and a control unit (e.g., 25) configured to control driving of the charge-and-discharge unit, wherein the command issuing unit causes the control unit to operate for issuing the command to perform the charging and discharging, and causes the control unit not to operate in a case where the command issuing unit restrains an issuance of a command to start the discharging or an issuance of a command to start the charging. The third aspect does not cause the control unit of the vehicle to operate unnecessarily.

In a fourth aspect, the vehicle further includes an auxiliary battery (e.g., 23) configured to receive electric power from the battery and store the electric power, wherein the control unit controls the driving of the charge-and-discharge unit based on the electric power of the auxiliary battery. The fourth aspect does not cause unnecessary consumption of the electric power of the auxiliary battery.

In a fifth aspect, the auxiliary battery is charged with the electric power of the battery while the charge-and-discharge unit is charging the battery. The fifth aspect makes it possible to charge the auxiliary battery appropriately.

In a sixth aspect, the auxiliary battery is charged with the electric power of the battery while the vehicle is traveling. The sixth aspect makes it possible to charge the auxiliary battery appropriately.

In a seventh aspect, the electric power management device further includes a reception unit (e.g., S1000 to S1100) configured to accept information indicating the charging rate of the battery from the vehicle when the vehicle is electrically connected to the building. The seventh aspect makes it possible to restrain the unnecessary performance of charging and discharging described above in cases, for example, where the vehicle is electrically connected to the building with the charging rate of the battery being not more than the lower-limit value of the target range, where the vehicle is electrically connected to the building with the charging rate being not less than the upper-limit value of the target range, and the like.

In an eighth aspect, the electric power management device further includes a reception unit (e.g., S1360 and S1560) configured to accept information indicating the charging rate of the battery at a time of starting the charging and discharging, after the command issuing unit issues a command to perform the charging and discharging. Also the eighth aspect makes it possible to restrain the unnecessary performance of charging and discharging.

In a ninth aspect, the building is configured to be able to accept electric power from an electric power system (e.g., 9) and includes a power generator (e.g., 11) configured to be able to generate another kind of electric power different from the electric power from the electric power system, wherein the command issuing unit issues a command to perform the charging and discharging in accordance with supply-demand balance between a demand of electric power in the building and a supply of electric power from the power generator. The ninth aspect makes it possible to utilize the battery in accordance with the supply-demand balance of the electric power in the building.

In a tenth aspect, at a time when the command issuing unit issues a command to stop the charging and discharging in response to a change in the supply-demand balance of the electric power in the building, the storage unit stores the charging rate of the battery at times of starting the charging and discharging. This enables the first aspect to be carried out appropriately.

In an eleventh aspect, at a time when a predetermined time period elapses since the charging and discharging is started, the storage unit stores the charging rate of the battery at the time, and then the command issuing unit continues the charging and discharging. This enables the first aspect to be carried out appropriately.

The invention is not limited to the foregoing embodiments, and various variations/changes are possible within the spirit of the invention.

What is claimed is:

1. An electric power management device that manages electric power in a building configured to be electrically connectable to a vehicle including a battery, a charge-and-discharge unit configured to be able to perform charging from the building to the battery and discharging from the battery to the building, a control unit configured to control driving of the charge-and-discharge unit, and an auxiliary battery configured to receive electric power from the battery and store the electric power, the electric power management device comprising:
- a command issuing unit configured to issue a command to perform charging and discharging of the battery;
- a specifying unit configured to specify a target range for a charging rate of the battery in performing the charging and discharging; and
- a storage unit configured to store the charging rate of the battery in performing the charging and discharging, wherein in a case where the charging rate stored in the storage unit is not more than a lower-limit value of the target range, the command issuing unit restrains an issuance of a command to start discharging of the battery, and in a case where the charging rate is not less than an upper-limit value of the target range, the command issuing unit restrains an issuance of a command to start charging of the battery, the command issuing unit causes the control unit to operate for issuing the command to perform the charging and discharging, and causes the control unit not to operate in a case where the command issuing unit restrains an issuance of a command to start the discharging or an issuance of a command to start the charging, the control unit controls the driving of the charge-and-discharge unit based on the electric power of the auxiliary battery, and the auxiliary battery is charged with the electric power of the battery while at least one of: the charge-and-discharge unit is charging the battery; and the vehicle is traveling.

2. The electric power management device according to claim 1, wherein in a case where the charging rate stored in the storage unit falls within the target range, the command issuing unit continues the charging and discharging while keeping the charging rate of the battery within the target range, and in a case where the charging rate of the battery falls out of the target range, the command issuing unit issues a command to stop the charging and discharging.

3. The electric power management device according to claim 1, further comprising a reception unit configured to accept information indicating the charging rate of the battery from the vehicle when the vehicle is electrically connected to the building.

4. The electric power management device according to claim 1, further comprising a reception unit configured to accept information indicating the charging rate of the battery at a time of starting the charging and discharging, after the command issuing unit issues a command to perform the charging and discharging.

5. The electric power management device according to claim 1, wherein the building is configured to be able to accept electric power from an electric power system and includes a power generator configured to be able to generate another kind of electric power different from the electric power from the electric power system, and the command issuing unit issues a command to perform the charging and discharging in accordance with supply-demand balance between a demand of electric power in the building and a supply of electric power from the power generator.

6. An electric power management device that manages electric power in a building configured to be electrically connectable to a vehicle including a battery, the electric power management device comprising:
- a command issuing unit configured to issue a command to perform charging and discharging of the battery;
- a specifying unit configured to specify a target range for a charging rate of the battery in performing the charging and discharging; and
- a storage unit configured to store the charging rate of the battery in performing the charging and discharging, wherein in a case where the charging rate stored in the storage unit is not more than a lower-limit value of the target range, the command issuing unit restrains an issuance of a command to start discharging of the battery, and in a case where the charging rate is not less than an upper-limit value of the target range, the command issuing unit restrains an issuance of a command to start charging of the battery, and at a time when the command issuing unit issues a command to stop the charging and discharging in response to a change in the supply-demand balance of the electric power in the building, the storage unit stores the charging rate of the battery at times of starting the charging and discharging.

7. An electric power management device that manages electric power in a building configured to be electrically connectable to a vehicle including a battery, the electric power management device comprising:
- a command issuing unit configured to issue a command to perform charging and discharging of the battery;
- a specifying unit configured to specify a target range for a charging rate of the battery in performing the charging and discharging; and
- a storage unit configured to store the charging rate of the battery in performing the charging and discharging, wherein in a case where the charging rate stored in the storage unit is not more than a lower-limit value of the target range, the command issuing unit restrains an issuance of a command to start discharging of the battery, and in a case where the charging rate is not less than an upper-limit value of the target range, the command issuing unit restrains an issuance of a command to start charging of the battery, and at a time when a predetermined time period elapses since the charging and discharging is started, the storage unit stores the charging rate of the battery at the time, and then the command issuing unit continues the charging and discharging.

\* \* \* \* \*